United States Patent [19]

Kraus et al.

[11] Patent Number: 4,672,449
[45] Date of Patent: Jun. 9, 1987

[54] LINE DEFLECTION CIRCUIT FOR PICTURE PICK-UP OR DISPLAY DEVICES

[75] Inventors: Uwe E. Kraus; Arnoldus J. J. Boudewijns; Cornelis A. M. Boon; Adrianus J. Frensch, all of Eindhoven, Netherlands

[73] Assignee: U.S. Philips Corporation, New York, N.Y.

[21] Appl. No.: 769,283

[22] Filed: Aug. 26, 1985

[30] Foreign Application Priority Data

Sep. 3, 1984 [NL] Netherlands .................. 8402682
Jun. 28, 1985 [NL] Netherlands .................. 8501861

[51] Int. Cl.$^4$ .................. H04N 5/04; H01J 29/70
[52] U.S. Cl. .................. 358/148; 358/64; 358/158; 358/217; 358/219; 358/242; 315/389; 315/399; 340/814
[58] Field of Search .................. 315/399, 408, 389, 371, 315/367; 358/148, 158, 150, 41, 44, 56, 64, 68, 179, 209, 217, 219, 242, 230; 340/814

[56] References Cited

U.S. PATENT DOCUMENTS 4,463,288 7/1984 Judd .................. 315/371
4,510,527 4/1985 den Hollander .................. 358/158

Primary Examiner—James J. Groody
Assistant Examiner—Michael D. Parker
Attorney, Agent, or Firm—Thomas A. Briody; Jack Oisher; William J. Streeter

[57] ABSTRACT

A picture pick-up or display device, respectively for recording a scene or displaying a scene image, respectively with the aid of a line raster formed by a plurality of horizontal lines which are consecutively scanned in opposite directions. The device comprises a line deflection circuit in which the line deflection coil forms part of a resonant circuit whose tuning frequency is substantially equal to half the line frequency, as a result of which the power dissipation is kept low. By means of a control circuit it is ensured that corresponding points of scanned lines are accurately in line in the vertical direction, the control circuit being arranged for causing a zero-crossing of the line deflection current and a signal which is characteristic of half the video information of a line substantially to coincide. The control circuit comprises an analogue delay element for setting the time position of this signal.

14 Claims, 4 Drawing Figures

LINE DEFLECTION CIRCUIT FOR PICTURE PICK-UP OR DISPLAY DEVICES

FIELD OF THE INVENTION

The invention relates to a picture pick-up or display device, respectively for recording a scene or displaying a scene image, respectively with the aid of a line raster formed by a plurality of horizontal lines which are consecutively scanned in opposite directions, comprising a video signal processing circuit for generating or conveying, respectively the video information of a line in one direction and the video information of the subsequent line into the opposite direction and a line deflection circuit for generating a line deflection current through a line deflection coil, the video signal processing circuit comprising a read memory and a clock oscillator for generating a clock signal for reading the video information from the read memory, the clock oscillator being included in a control loop for determining the read instants relative to the line deflection, the control loop also comprising a counter for counting pulses of the clock signal, and also means for applying to a comparator stage a first signal originating from the line deflection circuit and a second signal originating from the counter.

BACKGROUND OF THE INVENTION

European Patent Application No. 51 092 discloses a picture display device in which the line deflection, i.e. the deflection in the horizontal direction of the electron beam(s) generated in the picture display tube, is symmetrical and, for example, sinusoidal. Compared with the asymmetrical, usually sawtooth-shaped line deflection, in which the (invisible) retrace is many times shorter than the trace, the symmetrical line deflection has a number of advantages, more specifically its lower power dissipation, the lower voltage load of the components in the line deflection circuit and the lower high-frequency radiation. These advantages are of particular importance when a high line frequency is used, for example higher than the frequency prescribed by a present-day television standard, the retrace period with the sawtooth-shaped deflection being very short, for example of the order of magnitude of 2 to 6 $\mu$s. A description of the dissipation and of the voltage load at the sawtooth line deflection is given for different values of the line frequency in the article "Practical Considerations in the Design of Horizontal Deflection Systems for High-Definition Television Displays", published in the periodical "IEEE Transactions on Consumer Electronics", Vol. CE-29, No. 3, August 1983, pages 334 to 349.

In the arrangement disclosed in said European Patent Application said comparator stage is comprised of a sample-and-hold circuit to which the voltage present across the deflection coil is applied as a first signal. This voltage is measured during the occurrence of the signal from the counter, which signal occurs once in a period, and the measured value is maintained substantially constant by the operation of the control loop. In this way the video information is read at instants which are fixed relative to the line deflection. The position of the picture elements read can be set with the aid of a variable resistor. This setting means is included in the output lead of the sample-and-hold circuit and thus influences the control signal. The prior art arrangement also comprises a memory in which data are stored for supplying an additional control signal. Linearity errors are corrected with the aid of said means and picture elements of different picture lines which should be in the same horizontal position are indeed displayed along a vertical straight line.

The invention is based on the recognition that this object can only be accomplished if certain conditions are satisfied. If the amplitude of the voltage across the line deflection coil varies, then the value which is kept constant does not correspond with the appropriate picture element. This implies a horizontal shift of the video information into a certain direction for a line and into the opposite direction for the subsequent line. Also the setting effected with the aid of the variable resistor results in a voltage variation and consequently in a similar shift in the event of amplitude variations. Such a variation of the voltage across the deflection coil may happen as a result of spreads and/or temperature and ageing phenomena. In addition, for correcting the raster distortion the amplitude of the line deflection is modulated at the field frequency, so that said voltage across the coil varies during a field. So, if the picture elements are adjusted to the proper position for a given pair of lines, the position of corresponding picture elements above and/or below this pair is not the proper position in the displayed picture, even if errors due to spreads or the above-mentioned phenomena are absent, so that a vertical straight line to be displayed is not displayed as a vertical straight line. This results in an annoying frayed edge being displayed.

SUMMARY OF THE INVENTION

The invention has for its object to provide an arrangement of the above-defined type which does not have the described disadvantage. In the arrangement a control similar to the control in the prior art arrangement does not depend on amplitude variations. To that end, according to the invention, the picture pick-up or display arrangement, respectively is characterized in that the comparator stage is a phase comparator stage to which a zero-crossing detector is connected for producing the first signal at a instant at which the line deflection current has substantially zero value and that an analogue delay element is coupled to the phase comparator stage for applying the second signal, this second signal substantially coinciding with the centre clock pulse of a line, the control loop being arranged for causing the first and second signals to occur substantially simultaneously.

Because of this measure, the position of half the video information of each line is adjusted to the appropriate position, relative to the zero-crossing of the line deflection current. This zero-crossing depends only to a small extent on variations caused by spreads, temperature and ageing and does not depend on amplitude variations. As the delay element is provided in the control loop between the counter and the phase-comparator stage, so in an input lead of this stage, a setting thereof influences the time difference between the first and second signals, and consequently the position of the read video information relative to the line deflection current, but does not influence the amplitude of the deflection. Consequently a setting can be found for which the picture elements have the appropriate horizontal position. For an accurate setting it is important for the delay element to be an analog element.

In one embodiment an arrangement according to the invention is further characterized in that the control loop comprises a second, adjustable delay element for delaying the starting instant of recording or displaying, respectively the video information relative to an incoming line synchronizing signal by a delay which is adjustable by a control signal operated by the phase comparator stage.

Alternatively a preferred embodiment of an arrangement according to the invention, the frequency of the clock oscillator being controllable by a control signal generated by the comparator stage and the counter having a length corresponding to two line periods, is characterized in that the delay element is adjustable for causing a picture element in the centre of the video information of a line to substantially coincide with a point of the pick-up or display screen, respectively for which the line deflection has zero value.

Advantageously, in this case the device is further characterized in that the delay element is controllable by a second control signal generated by a second phase comparator stage, the zero-crossing detector and also an output of the video signal processing circuit being coupled to this second phase comparator stage, the device also comprising a signal generator for generating a video signal having a transition in the centre of a line which is invisible on display, the second phase comparator stage being inoperative outside said line period. This measure provides an automatic setting of the delay element for compensating for time errors which may be caused in the video signal processing circuit.

The invention will now be described in greater detail by way of example with reference to the accompanying Figures. Therein:

DETAILED DESCRIPTION OF THE INVENTION

Figure 1:
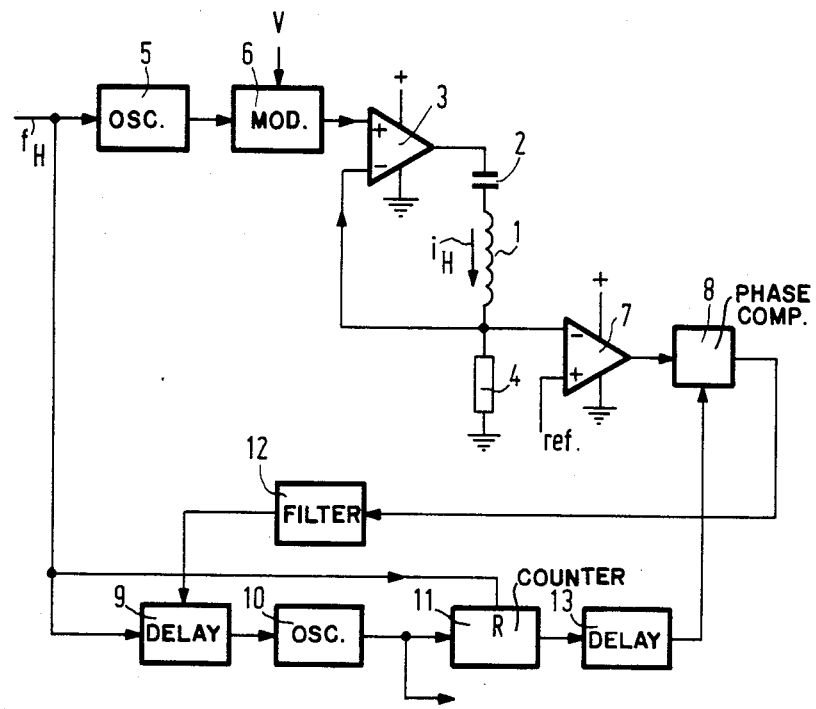
FIG. 1 shows a portion of a picture display device, for example a television receiver, according to the invention, in which the delay produced by the delay element is controlled.

FIG. 1 reference numeral 1 denotes a line deflection coil through which in operation a line deflection current $i_H$ flows. Coil 1 is arranged in series with a capacitor 2 and the series network formed is connected to the output terminal of a power amplifier 3. A negative feedback resistor 4, whose other side is connected to ground is arranged in series with network 1, 2. The junction point of network 1, 2 and resistor 4 is connected, optionally via a feedback network, to an inverting input terminal of amplifier 3 a non-inverting input terminal of which receives a control signal. Capacitor 2 ensures d.c. isolation between amplifier 3 and coil 1. In addition, elements 1 and 2 form a series resonant circuit whose turning frequency is substantially equal to half the line frequency, the line frequency being the number of horizontal lines scanned each second on the display screen of a picture display tube, not shown, by the electron beam(s) generated therein.

In known manner, amplifier 3 converts the control signal thereof, which has a frequency equal to half the line frequency, into a current $i_H$. As a function of time, current $i_H$ varies sinusoidally with half the line frequency. The control voltage is a sinusoidal voltage generated by a sine oscillator 5. Oscillator 5 is synchronized in known manner by incoming line synchronizing pulses, for example because it forms part of a line phase control loop. The oscillator 5 may alternatively have the line frequency; the frequency of the oscillator signal is divided by two by a frequency-dividing circuit and the signal obtained is given the required sinusoidal shape by means of a shaping circuit. The phase control loop comprises a phase discriminator for comparing the phase of the incoming line synchronizing signal with the oscillator signal and for readjusting the oscillator as a function of the phase difference thus determined. These synchronizing problems can be easily solved by a person skilled in the art and require no further explanation. The same applies to the structure of elements 5 and 3.

In the described example of the series resonance the path through which current $i_H$ flows has a low ohmic impedance. Amplifier 3 behaves as a voltage source having a low output impedance and needs to produce only comparatively little power, more specifically the power dissipated by current $i_H$ in said impedances and in resistor 4, and also the power required for compensating for losses in the different components of the circuit. During a line duration, i.e. one half of a period, current $i_H$ flows in the direction shown in FIG. 1, namely from amplifier 3 to coil 1, and during the subsequent line duration, i.e. the following half of the period, current $i_H$ flows in the opposite direction back again to amplifier 3. By means of the voltage present across resistor 4 a negative feedback is effected for stabilizing and linearizing the operation of the circuit. In a way different from the way shown in FIG. 1 amplifier 3 may be in the form of a self-oscillating output stage, in which case oscillator 5 may be omitted.

Coil 1 may also be included in a parallel resonant circuit. Coil 1 and resistor 4 are then arranged in series between the output of amplifier 3 and ground, while capacitor 2 is arranged in parallel with the series network formed. If necessary an isolating capacitor can be included between amplifier 3 and the resonant circuit. The resonant circuit has a high impedance in the vicinity of the tuning frequency and amplifier 3 behaves as a current source having a high output impedance. During a line duration current $i_H$ flows in the direction from capacitor 2 to coil 1 and during the subsequent line duration current $i_H$ flows in the opposite direction back again to capacitor 2. This holds, as also for the case shown in FIG. 1, for the steady state. Also in this case amplifier 3 supplies comparatively little power, more specifically the power dissipated in said, high impedances, in resistor 4 and in the ohmic resistance of coil 1, and due to further losses in the circuit. If so desired, coil 1 can be connected in a different way, not shown, to amplifier 3, for example with the aid of a transformer or an autotransformer. The only condition to be satisfied is that tuning must be effected to half the line frequency.

For correcting the east-west raster distortion, the amplitude of current $i_H$ can be modulated using the described circuit at a low signal level and consequently with little dissipation by including a modulator 6 in the drive lead of amplifier 3 between oscillator 5 and the amplifier. A field-frequency signal V having the variation required for the correction is applied to modulator 6. To correct, for example, the pin-cushion distortion, signal V is in the shape of a parabola. The sinusoidal control voltage of half the line frequency applied to amplifier 3 and consequently current $i_H$ therefore have an amplitude varying at the field frequency, the envelope being parabolic with a maximum halfway the field period. Alternatively, modulator 6 may be included in the negative feedback path between the resistor 4 and amplifier 3.

Because of the measure just described a geometry error of the display picture can be corrected. A further correction to be effected is known as the S-correction. This corrects the geometry error caused by the fact that the spherical display screen has a large radius. In prior art line deflection circuits in which the deflection current is sawtooth-shaped, the S-correction is effected because an S-shape is given to the variation of the current as a function of time. To this effect the d.c. isolating capacitor which is arranged in series with the line deflection coil is given a non-infinite capacity. Together with this S-capacitor the coil forms a series-resonant circuit whose resonant frequency is many times lower than the line frequency, so that the S-shape obtained deviates only little from the linear shape. This holds for the line trace period. During the retrace period the coil and a retrace capacitor form a parallel resonant circuit whose resonant frequency is many times higher than the line frequency. In the retrace period the line deflection current varies in accordance with a cosine function of time, more specifically during half the period of this function. Because of the choice of the S-capacitor the desired measure of S-correction and consequently the horizontal linearity can be set, while the capacitance of the retrace capacitor determines the duration of the retrace period.

Figure 2:
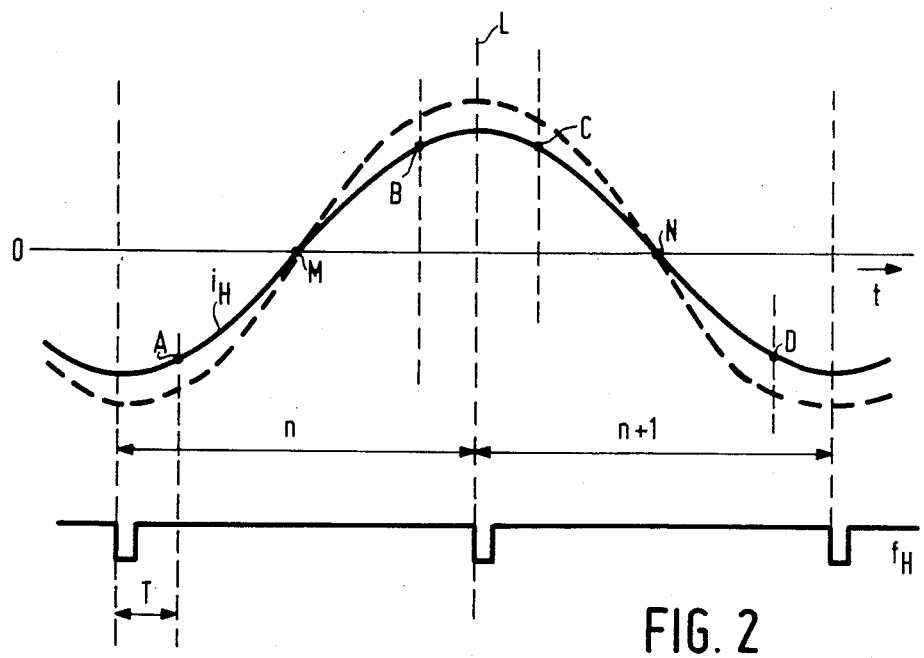
FIG. 2 is a diagram of the line deflection current as a function of time during two consecutive line periods.

In the circuit shown in FIG. 1 or in a described but not depicted variation thereof, such a simple measure cannot be used. Also a linearity correction with the aid of a variable series inductance cannot be used since the value of the resonant frequency is fixed and is the same for both deflection directions. Also the phase of the line deflection current is fixed since the current must be substantially zero halfway the line trace period where no deflection should be effected. It is possible, however, to set the amplitude of the line deflection current in order to correct the linearity. In FIG. 2 a solid-line curve represents the variation of current $i_H$ versus time. During a given line period, a given line, line n, is displayed in a certain direction, for example from left to right and during the line period subsequent thereto line n+1 is displayed in the opposite direction, from right to left. The two line periods together form one period of the sine function. A dotted curve in FIG. 2 represents the same variation of current $i_H$, but now with a larger amplitude. Both curves intersect the zero axis in the centre M and N, respectively of each line period and both reach extreme values at the transition from one line period to the subsequent line period, namely a minimum at the beginning of line n and at the end of line n+1 and a maximum at the end of line n.

For a specific picture display tube the radius of the spherical display screen is known. Also the distance between the central point of the screen and the deflection centre is known. The deflection centre is that point on the symmetry axis of the tube the electron beam seems to come from. As the width of the screen measured along the central horizontal line and also the duration of the active portion of the line deflection current, that is to say the time during which the point where the electron beam impinges on the screen is visible are known, the velocity of this point is determined. Now the variation of the line deflection current for which a geometrically correct picture is obtained can be determined. This variation is found to have an S-shape. FIG. 2 shows that for the sinusoidal line deflection current an amplitude can be found which is such that the resultant curve in FIG. 2 proximates said S-shape to the best possible extent in the active portion of the current. This is accomplished in a simple way because of the fact that amplifier 3 has a setting feature for setting the gain. With this setting, with which the amplitude of the current can be matched to the curvature of the display screen, the least possible linearity error is consequently obtained. An alternative is to set the amplitude of oscillator 5.

The picture display device comprises memories for processing in a known manner the video signal, more specifically for displaying the video information, one line from left to right on the display screen and the line subsequent thereto from right to left. These memories can be used in a simple way for time compression or decompression of the video signal because the read clock frequency and consequently the read rate of the memories are set. This setting ensures that the video information is read in that period of time which corresponds to the active portion of the horizontal deflection on the picture screen. Thus, the width of the displayed picture is adjusted and adapted to the linearity setting. This is a static adjustment. In addition, the preset read clock frequency can be modulated at field frequency for correcting the east-west distortion. As a large variation of said frequency would cause the luminance of the displayed information to vary, this modulation must remain small. In addition, a small frequency modulation can be superposed thereon for a location-dependent reduction of horizontal linearity errors. These fine controls cannot replace the modulation by means of modulator 6 and the amplitude setting of amplifier 3.

From the foregoing it will be apparent that the display of video information starts at a determined instant in the line period and terminates at another determined instant, the time interval between these two instants being shorter than half the period of the line deflection current and the centre of the video information being displayed substantially in the centre of the relevant line on the display screen, that is to say in accordance with the port M where the sine wave intersects the zero axis in FIG. 2. This must hold for any amplitude of current $i_H$. It is moreover desirable for said instants of line n to be in accurate symmetry with the corresponding instants for line n+1 relative to the straight line L which, in FIG. 3, forms the transition between line n and line n+1. In this situation the variation of current $i_H$ is assumed to be accurately mirror-symmetrical. Without said symmetry the points of a vertical straight line would not be displayed accurately below each other on the display screen, which would be a very serious fault. A further condition to be satisfied is that the lines displayed on the display screen are parallel to each other, preferably horizontal, which can be accomplished in known manner with the aid of a stepped vertical deflection.

The required symmetry implies a high Q for the resonant circuit at the output of amplifier 3 and/or a high accuracy for the input signal thereof. The symmetry requirement also implies that the points on the display screen at which the display of the video information starts are located below each other and consequently that the value of current $i_H$ at the corresponding instant for line n is equal to the corresponding value for line n+1. The same holds for the end of the display. In addition, the value of current $i_H$ is at the starting instant symmetrical relative to the zero axis to the value of current $i_H$ at the final instant. The amplitude variation caused by the east-west correction between line n and line n+1 is assumed to be so small as to be disregarded. The foregoing implies that the position of the point on the screen where the beam impinges corresponds unambiguously with the value of the line deflection current in this point, which in practice can be realized by measuring the value of current $i_H$ and by using the measured value for starting and stopping, respectively of reading information from the video signal processing memory. For this purpose it is, for example, possible to measure the peak value of the current. In view of the large number of picture elements per line such a measurement must be performed with a high degree of accuracy. This was found to be difficult in practice and for that reason measurement is effected in a different manner.

The voltage at the junction of deflection coil 1 and resistor 4 is applied to the inverting input of an amplifier 7, which acts as a comparator stage and whose noninverting terminal is connected to a reference voltage. This reference voltage corresponds to the zero crossing of current $i_H$, so that in principle this voltage has zero value. However, in practice it will deviate from zero because of small tolerance errors caused by, for example, the field deflection current in the magnetic material core of the deflection unit. In these circumstances a signal, for example a pulse edge, is present at an output terminal of amplifier 7, at the zero-crossing of the current $i_H$. Consequently, this amplifier functions as a zero-crossing detector and may be of a known structure, for example a Schmitt-trigger. The output signal thereof is applied to a phase comparator stage (, i.e., discriminator) 8. In a different, known manner a zero-crossing signal can be generated with the aid of a small transformer arranged in series with deflection coil 1.

The circuit of FIG. 1 also comprises a delay element 9, to which pulses of the line frequency are applied and which produces a variable delay T. The pulses delayed by element 9 are applied to a clock oscillator 10 to make it operative. Oscillator 10 generates a signal having the shift clock frequency which is used for reading the video memories. This frequency, which may be adjustable and/or modulatable for the above-described reasons is a multiple of the line frequency. Its value depends on the number of picture elements displayed. Oscillator 10 is of a known construction, it is for example a start-stop oscillator or is implemented by means of a phase-control loop. The clock signal of oscillator 10 is also applied to a counter 11. Counter 11 counts the clock pulses produced by oscillator 10 until half the picture elements of a line have been read from the video read memory. To this end, counter 11 may be a counter having a length equal to half the number of samples per line. At the instant at which counter 11 reaches its final counting position a pulse edge is applied to phase comparator stage 8. A delay element 13 is arranged between counter 11 and stage 8 for compensating for delays in the video signal processing channel.

Stage 8 is of a known construction, for example in the form of a phase discriminator, whereby an error signal is generated which depends on the time difference between the signals applied thereto and is applied via a loop filter 12 to delay element 9 for controlling the delay produced thereby. From this it will be obvious that elements 8-13 form a control loop whose operation is such that the zero crossing signal produced by detector 7 and the counting signal of counter 11 occur substantially simultaneously, more specifically at an instant which in FIG. 2 corresponds to point M. FIG. 2 shows the line-frequency synchronizing pulses $f_H$ which are applied to both oscillator 5 and element 9. At an instant corresponding to a point A of the sine wave, reading the video information from the memory starts. This instant is located a time T after the occurrence of the leading edge of a pulse, which time T is controlled in the way described in the foregoing. At an instant corresponding to a point B of the sine wave, reding of the video information is terminated. As the time interval between points A and M corresponds to half the video information, also the time interval between points M and B corresponds to half the video information, so that points A and B are symmetrical relative to point M, and as the time interval between the leading edge of the line pulse and point M is substantially equal to the corresponding time interval in line n+1, the sine-wave in line n+1 has substantially the same value at the starting instant (point C) of the reading operation as in point B and substantially the same value at the final instant (point D) of the reading operation as in point A. The same holds for the line n+2, not shown, so that the conclusion is justified that a vertical straight line to be displayed on the display screen will indeed be displayed as a vertical straight line. No video information is displayed between points B and C. In the correpsonding time interval the electron beam must be blanked, which may be effected with the aid of a pulse applied to an appropriate electrode of the picture display tube and whose duration is equal to said interval.

It should be noted that the described control is independent of amplitude variations since the zero-crossing of the deflection current does not vary. The control also has the advantage that the delay produced by element 9 also compensates for all types of phase tolerances, for example small phase errors caused by a non-accurate tuning of the sine wave because of, among other reasons, the above-mentioned magnetic effects produced by the field deflection current and/or by phase changes between current $i_H$ and the incoming line signal. Counter 11 is reset each time after the prescribed final counting position has been reached, which is effected because a delayed or non-delayed pulse of the line frequency is applied to a resetting terminal R of counter 11.

Figure 3:
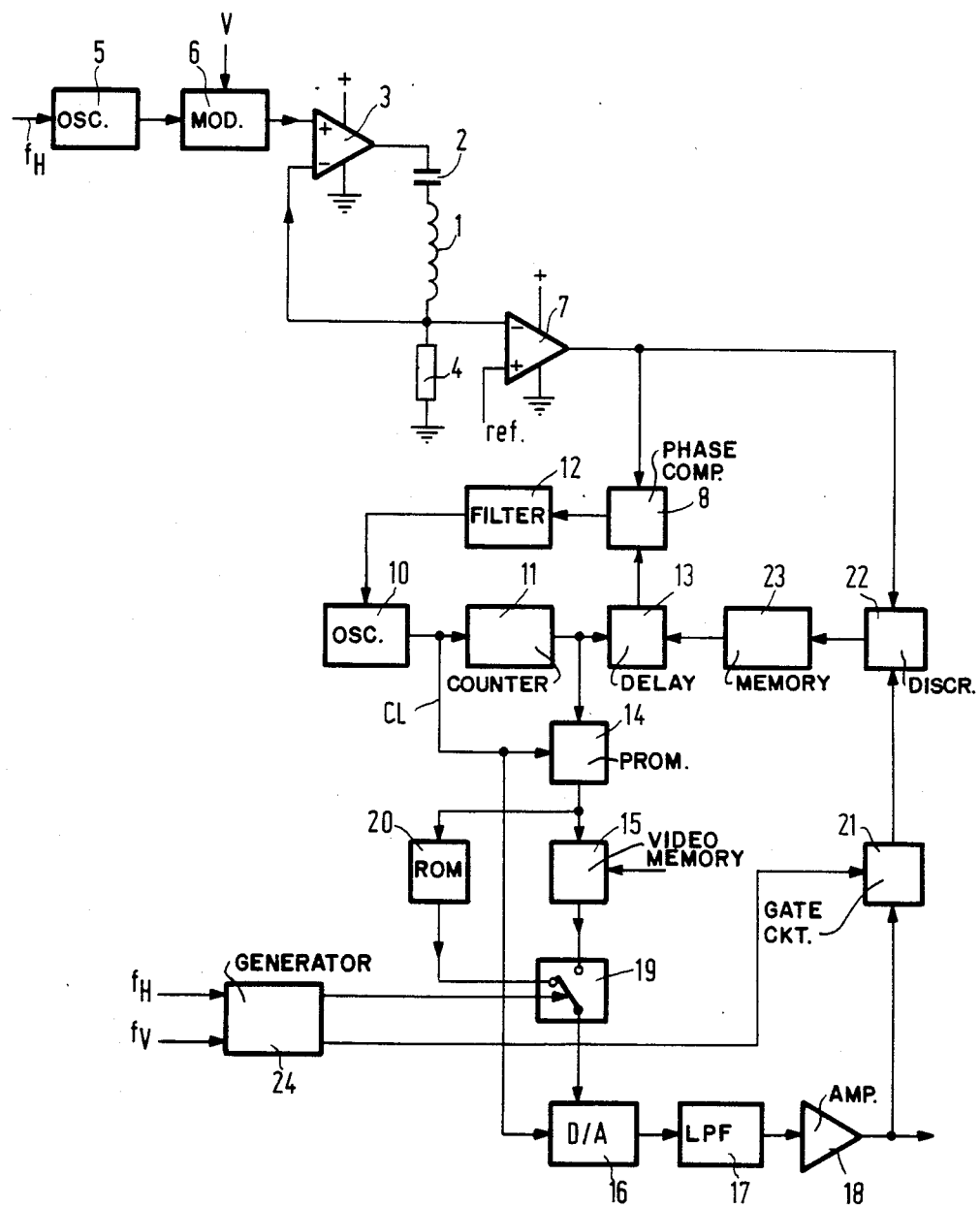
FIG. 3 shows a portion of a picture display device in which the measures of the invention are applied, wherein the clock frequency is controlled.

FIG. 3 represents an embodiment of the circuit according to the invention in which the video information is not synchronized with the incoming line synchronizing signal but with the line deflection, more specifically because clock oscillator 10 is controlled by the control signal of filter 12, so that element 9 may be dispensed with. In FIG. 3 elements which correspond to those in FIG. 1 are given the same reference numerals. In the steady state of the control loop the frequency of the clock signal is locked onto the line frequency as the zero-crossing pulse applied to the discriminator 8 is generated for each positive or negative zero-crossing of the line deflection current. As is also the case for FIG. 1, the signal of oscillator 10 is the clock signal for the video memories, which signal is now generated continuously. Counter 11 generates the pulse which is characteristic of half the video information of a line period and whose phase is compared with the phase of the zero-crossing pulse.

Figure 4:
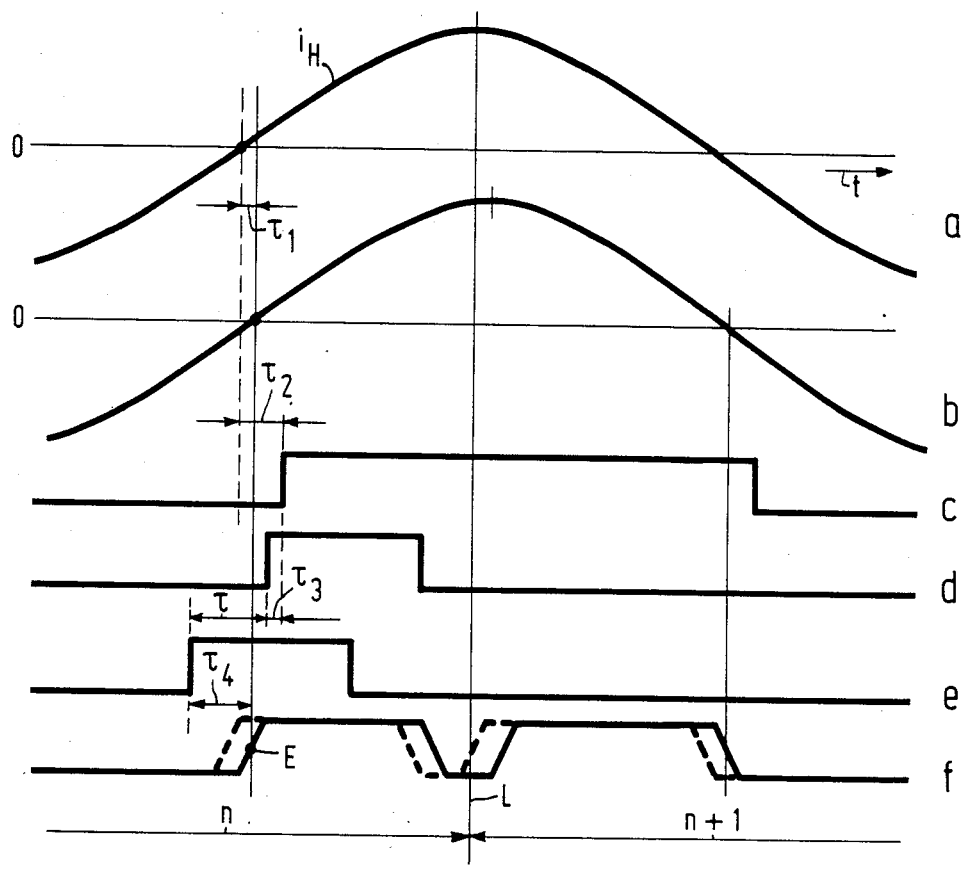
FIG. 4 shows waveforms occurring in the arrangement shown in FIG. 3.

In FIG. 4a current $i_H$ is again plotted as a function of time, while FIG. 4b represents the horizontal deflection field produced thereby. Because of the hysteresis of the magnetic material around which coil 1 is wound, the deflection field becomes zero a period of time $\tau_1$ after current $i_H$ has got zero value. Detector 7 also introduces a delay, which results in the leading edge of the pulse at the output of detector 7 (see FIG. 4c) occurring a period of time $\tau_2$ after the zero-crossing of current $i_H$. Phase discriminator 8 has a certain off-set, that is to say its output signal indicates a zero phase between the input signals, while the leading edge of the pulse produced by element 13 (see FIG. 4d) actually occurs a time $\tau_3$ prior to the leading edge of the pulse supplied by detector 7. Element 13 produces a delay $\tau$, so that the leading edge of the output signal of counter 11 (see FIG. 4e) occurs at an instant which precedes the instant at which the leading edge of the pulse of FIG. 4d occurs by a time $\tau$. The different delays are shown in FIG. 4 in an exaggerated manner.

Counter 11 is a synchronous m-counter counting from m−1 to 0 in one period of the sinusoidal line deflection current. The output of counter 11 is connected to a programmable read-only memory 14 to which the signal of oscillator 10 is applied as a clock signal. The output signal of counter 11 is used as an address for memory 14 which supplies the addresses for a video memory 15 in which the video information is stored. The addresses read from memory 14 read the video information from memory 15. A video signal is applied to the appropriate electrode of the picture display tube via, one after the other, a digital-to-analogue converter 16 to which also the clock signal of oscillator 10 is applied, a low-pass filter 17 and a video output amplifier 18. FIG. 4f shows the shape of this signal for the simple case in which the picture to be displayed has a black-to-white transition halfway the picture display screen. During a first line, which is written from left to right, i.e., for example, line n in FIG. 2, the signal of FIG. 4f first has a low level and thereafter a transition to a higher level. During line n+1 the video signal varies in the opposite direction and during the line blanking period between lines n and n+1 the signal has the low level corresponding to black. Because of the non-infinitely short delay of the signals in elements 14 to 18 the video signal occurs a certain period of time after the corresponding counter signal. More specifically, the centre E of the transition in the signal of FIG. 4f occurs at an instant which follows a time $\tau_4$ after the instant at which the leading edge of the pulse of FIG. 4e occurs.

The diagrams of FIGS. 4a to 4f show that the time errors introduced are accurately compensated when the time delay $\tau$ produced by element 13 is set such that:

$$\tau = -\tau_1 + \tau_2 - \tau_3 + \tau_4.$$

In that case point E in FIG. 4f is located on the vertical straight line which passes through the zero-crossing of the curve in FIG. 4b; but differently, the black-to-white transition occurs in line n halfway the display screen at the instant at which the deflection field has zero value. Because of the fact that the sine wave is symmetrical, the same holds for the corresponding transition in line n+1 and consequently for all the lines of the picture. An incorrect setting of the delay $\tau$ causes the signal of FIG. 4f to shift, for example to the left: this is shown in FIG. 4f by means of a dotted line. For line n an incorrect setting results in a shift to the left of the black-to-white transition, while the transition in line n+1 shifts to the right. The central vertical line is then displayed on the display screen with a frayed edge. Delay $\tau$ is adjustable and is set such that fraying of the edge is reduced to substantially zero.

The foregoing holds in the synchronized state of the control loop formed by elements 8 and 10 to 13, in which case the leading edges of the input signals of phase discriminator 8 substantially coincide (FIGS. 4c and d). In the non-synchronized state of the loop, for example at switch-on of the picture display device, oscillator 10 generally does not have the appropriate frequency, while said leading edges generally do not coincide. In these circumstances a control signal is obtained which causes the frequency of oscillator 10 to change until the situation shown in FIG. 4 is reached and maintained. In this situation oscillator 10 has the appropriate frequency and the output signal of counter 11 has the value m−1 at an instant which precedes the zero-crossing of the deflection field by a time $\tau_4$. At an instant which is a number of m/4 samples later than said instant, reading the video information from memory 15 terminates and at an instant which precedes the instant at which counter 11 counts the value m−1 by a number of m/4 samples, reading the video information of the same line has started.

Both in FIG. 1 and FIG. 3 reference numeral 13 denotes an analogue delay element of a known type, for example a delay line or a phase-shifting network producing a delay which can be set to a non-discrete value. It is important for element 13 to be an analogue element for enabling an accurate setting of delay $\tau$ and consequently a maximum horizontal resolution of the displayed picture. It will be obvious that a digital delay element, for example a counter set to discrete values can generally not be set to the exact value necessary for having the above-mentioned fray disappear, unless the clock frequency is very high.

Because of the high degree of sensitivity of the sinusoidal line deflection to phase errors it may however happen that a single setting of the delay is not sufficient. The horizontal resolution may again become poorer due to temperature influences and ageing phenomena. The circuit of FIG. 3 includes a control circuit for automatically setting the delay, as a result of which this disadvantage is obviated. For that purpose a black-to-white transition is generated in the centre of one line per field. This is a video signal having the same shape as the signal shown in FIG. 4f for line n or for line n+1. For this purpose a line is selected which precedes or is immediate subsequent to the field blanking and which is not visible on the display screen. The relevant digital signal is read from a memory 20, for example a ROM, which is also addressed by memory 14, and applied to converter 16 via a change-over switch 19. Switch 19 chooses between this signal and the video signal of memory 15 under the control of a keying signal which is generated by a generator 24 to which the line and field synchronizing signals, $f_H$ and $f_V$, are applied, and which occurs during the line period in which said transition is effected. The output of video amplifier 18 is applied to a gate circuit 21 which in response to the keying signal of generator 24 transmits the output signal of amplifier 18, which output signal is present during the occurrence of the keying signal. Circuit 21 is connected to an input of a phase discriminator 22. A further input of discriminator 22 is connected to the output of zero-crossing detector 7. During writing of said line, discriminator 22 measures the time difference between the black-to-white transition in the video signal on the electrode of the picture display tube and the zero-crossing of the line deflection current. The analogue information obtained is stored in a memory element 23, for example a capacitor, and is applied to delay element 13 for setting delay τ. To that end element 13 has a control input, for example for setting a voltage-dependent capacitance. The described control automatically compensates for time errors which may be produced in the video signal section, that is to say memory 15, converter 16 filter 17 aqnd amplifier 18, which components evidence more spread than the components whose time errors are not automatically removed, to wit amplifier 7 and discriminator 8. Also the non-automatically compensated hysteresis has only little spread. Compensation thereof is achieved by a fixed setting of element 13.

In a practical embodiment of the circuit, the line frequency being 31.250 kHz, i.e. twice the broadcast line frequency (European standard), the total losses in the line deflection coil were 8.75 W instead of 15.2 W at the sawtooth-shaped deflection having the same line frequency. The peak-peak voltage across the coil was reduced from approximately 2500 V to 700 V with the same inductance value, being 1.35 mH. The power section of the circuit could, in contradistinction to the sawtooth-shaped deflection, be constructed as part of an integrated circuit. Also the high-frequency radiation was considerably reduced. In the embodiment shown in FIG. 3 the length of counter 11 was equal to m=1536 at a nominal clock frequency of 24 MHz.

In the foregoing a picture display device with symmetrical line deflection is described. It will be obvious that the invention need not be limited thereto, as a similar line deflection with the same tuning condition as above is equally suitable for use with picture pick-up devices. The described measures relating to the display of video information for aligning corresponding picture elements below each other can be used similarly at the pick up side. The invention can also be used for a symmetrical line deflection of a non-sinusoidal shape, for example triangular.

What is claimed is:

1. In a picture pick-up apparatus for recording an image with a line raster formed by a plurality of lines, the lines being scanned in opposite directions, the apparatus including:
    a video processing circuit for generating video information of a line in one direction and video information of the subsequent line in the opposite direction, the video processing circuit including a read memory and a clock oscillator for generating a clock signal for reading video information from the read memory;
    a line deflection circuit for generating a line deflection current through a line deflection coil, thereby generating a line deflection;
    a control loop including the clock oscillator for determining the video information read at instants relative to the line deflection, the control loop further including a counter for counting pulses of the clock signal and means for applying to a comparator stage a first signal originating from the line deflection circuit and a second signal originating from the counter;
    wherein the comparator stage is a phase comparator stage and wherein the applying means includes a zero-crossing detector connected to the comparator stage for producing the first signal at an instant at which the line deflection current has substantially zero value; and
    wherein the apparatus further comprises:
    an analog delay element connected to the phase comparator stage for supplying the second signal thereto, the second signal substantially coinciding with a clock pulse at the center of a line; and
    wherein the control loop is arranged for effecting the first and second signals to occur substantially simultaneously.

2. The apparatus as claimed in claim 1, wherein the control loop comprises:
    a second adjustable delay element for delaying the instant for starting recording of the video information relative to an incoming line synchronizing signal by a delay, the delay being adjustable by means of a control signal generated by the comparator stage.

3. The apparatus as claimed in claim 2, wherein the second delay element utilizes the delayed signal from operating the clock oscillator to obtain a clock signal, the frequency of the clock signal being a multiple of the line frequency of the apparatus; and
    wherein the counter has a length equal to half the number of video information samples of a line, the counter counting the generated clock pulses for generating the second signal, the counter being reset by pulses of the line frequency.

4. The apparatus as claimed in claim 1, wherein the comparator stage generates a control signal for controlling the frequency of the clock oscillator and the counter has a length corresponding to two line periods; and
    wherein the delay element is adjusted for causing a picture element in the center video information of a line to substantially coincide with a point of a pick-up screen for which the line deflection has zero value.

5. The apparatus as claimed in claim 4, wherein the delay element is adjusted for reducing a frayed edge on the screen along a vertical straight line on pick-up of a transition in the video signal along this line.

6. The apparatus as claimed in claim 4, wherein the delay element is controlled by a second control signal generated by a second phase comparator stage, the zero-crossing detecting and an output of the video signal processing circuit being coupled to the second phase comparator stage; the apparatus further comprising:
    a signal generator for generating a video signal having a transition in the center of a second line invisible on display, the second comparator stage being inoperative outside the period of the second line.

7. The apparatus as claimed in claim 1, wherein the zero-crossing detector has applied thereto a selectable reference signal.

8. In a picture display apparatus for displaying an image with a line raster formed by a plurality of lines, the lines being scanned in opposite directions, the apparatus including:
    a video processing circuit for conveying video information of a line in one direction and video information of the subsequent line in the opposite direction, the video processing circuit including a read memory and a clock oscillator for generating a clock signal for reading video information from the read memory;

a line deflection circuit for generating a line deflection current through a line deflection coil, thereby generating a line deflection;

a control loop including the clock oscillator for determining the video information read at instants relative to the line deflection, the control loop further including a counter for counting pulses of the clock signal and means for applying to a comparator stage a first signal originating from the line deflection circuit and a second signal originating from the counter;

wherein the comparator stage is a phase comparator stage and wherein the applying means includes a zero-crossing detector connected to the comparator stage for producing the first signal at an instant at which the deflection current has substantially zero value; and wherein the apparatus further comprises:

an analog delay element connected to the phase comparator stage for supplying the second signal thereto, the second signal substantially coinciding with a clock pulse at the center of a line; and wherein the control loop is arranged for effecting the first and second signals to occur substantially simultaneously.

9. The apparatus as claimed in claim 8, wherein the control loop comprises:

a second adjustable delay element for delaying the instant for starting displaying of the video information relative to an incoming line synchronizing signal by a delay, the delay being adjustable by means of a control signal generated by the comparator stage.

10. The apparatus as claimed in claim 9, wherein the second delay element utilizes the delayed signal for operating the clock oscillator to obtain a clock signal, the frequency of the clock signal being a multiple of the line frequency of the apparatus; and wherein the counter has a length equal to half the number of video information samples of a line, the counter counting the generated clock pulses for generating the second signal, the counter being reset by pulses of the line frequency.

11. The apparatus as claimed in claim 8, wherein the comparator stage generates a control signal for controlling the frequency of the clock oscillator and the counter has a length corresponding to two line periods; and wherein the delay element is adjusted for causing a picture element in the center video information of a line to substantially coincide with a point of a display screen for which the line deflection has zero value.

12. The apparatus as claimed in claim 11, wherein the delay element is adjusted for reducing a frayed edge on the screen along a vertical straight line on pick-up of a transition in the video signal along this line.

13. The apparatus as claimed in claim 11, wherein the delay element is controlled by a second control signal generated by a second phase comparator stage, the zero-crossing detector and an output of the video signal processing circuit coupled to the second phase comparator stage; the apparatus further comprising:

a signal generator for generating a video signal having a transition in the center of a second line invisible on display, the second comparator stage being inoperative outside the period of the second line.

14. The apparatus as claimed in claim 8, wherein the zero-crossing detector has applied thereto a selectable reference signal.

* * * * *

UNITED STATES PATENT AND TRADEMARK OFFICE
CERTIFICATE OF CORRECTION

PATENT NO. : 4,672,449
DATED : June 9, 1987
INVENTOR(S) : Uwe E. Kraus, et al

It is certified that error appears in the above-identified patent and that said Letters Patent is hereby corrected as shown below:

IN THE CLAIMS

Claim 3. line 2      delete "from" insert --for--

Claim 6. line 4      delete "detecting" insert --detector--

Claim 8. line 21      after "the" insert --line--

Signed and Sealed this

Twenty-ninth Day of November, 1988

Attest:

DONALD J. QUIGG

*Attesting Officer*      *Commissioner of Patents and Trademarks*